US006025856A

United States Patent [19]

Ozawa et al.

[11] Patent Number: 6,025,856

[45] **Date of Patent: *Feb. 15, 2000**

[54] MAGNETIC INDICATION SHEET PRINTING METHOD AND MAGNETIC INDICATION SHEET PRINTING APPARATUS

[75] Inventors: Masamitsu Ozawa; Hisashi Masuda; Kiyoshi Urushibata, all of Shizuoka, Japan

[73] Assignee: Star Micronics Co., Ltd., Shizuoka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,544

[22] Filed: Feb. 5, 1996

[30] Foreign Application Priority Data

| | | | |
|---|---|---|---|
| Feb. 6, 1995 | [JP] | Japan | 7-042520 |
| Feb. 18, 1995 | [JP] | Japan | 7-053625 |
| Jul. 22, 1995 | [JP] | Japan | 7-207831 |

[51] Int. Cl.[7] ..................... G11B 9/00

[52] U.S. Cl. ..................... 346/74.3

[58] Field of Search ..................... 346/74.4, 74.2, 346/74.3, 136; 347/140, 139; 399/307, 306, 44; 430/66

[56] References Cited

U.S. PATENT DOCUMENTS 4,543,586 9/1985 Parker ..................... 346/74.4

*Primary Examiner*—John Barlow
*Assistant Examiner*—Raquel Yvette Gordon
*Attorney, Agent, or Firm*—Pollock, Vande Sande & Amernick

[57] ABSTRACT

A magnetic indication sheet printing method and a magnetic indication sheet printing apparatus for printing characters and such on a magnetic indication sheet being capable of carrying out an optimum printing process without being affected by the ambient temperature and the temperature of the magnetic indication sheet. The method and the apparatus magnetically indicates characters on the magnetic indication sheet by means of a magnetic field, where the sheet is heated to an appropriate temperature.

16 Claims, 18 Drawing Sheets

MAGNETIC INDICATION SHEET PRINTING METHOD AND MAGNETIC INDICATION SHEET PRINTING APPARATUS

BACKGROUND OF THE INVENTION

1. Field of the Invention

The present invention relates to a magnetic indication sheet printing method and a magnetic indication sheet printing apparatus for printing characters and such on a magnetic indication sheet on which an image can be magnetically recorded and from which an image can be magnetically erased.

2. Description of the Prior Art

A magnetic indication sheet, i.e., a magnetic indication medium, on which optional information can be magnetically written and from which recorded information can be magnetically erased has been proposed. This magnetic indication sheet is used independently or in combination with a card to indicate information by characters, patterns and such. Magnetic indication sheets disclosed in JP-B No. 48-41221 and JP-A No. 5-16578 are provided with innumerable microcapsules filled up with a suspension prepared by dispersing magnetic microflakes susceptible to a magnetic field in a transparent liquid. When a vertical magnetic field is applied to such a magnetic indication sheet, the magnetic microflakes are aligned to enable light to penetrate into the back surface of the magnetic indication sheet, so that the color of portions of the back surface corresponding to aligned magnetic microflakes become visible to indicate characters, patterns and such by color contrast. The aligned magnetic microflakes can be turned by a horizontal magnetic field to conceal the color of the back surface. Accordingly, the magnetic indication sheet can be used as a writable or erasable indication means.

Methods of writing information on or erasing information from a magnetic indication sheet are disclosed in JP-A Nos. 4-17089, 5-12049 and 55-12011.

Incidentally, the viscosity of the suspension filling up the microcapsules of the magnetic indication sheet is dependent on temperature. At a low temperature, the suspension has a high viscosity and hence the magnetic microflakes are dull of behavior in response to the applied magnetic field; consequently, characters, patterns and such cannot be indicated in a high contrast to the background and print quality is deteriorated, because the magnetic microflakes reflect light to obscure the color of the back surface if the magnetic microflakes are held in an oblique position. The viscosity of the suspension is low at a high temperature and the magnetic microflakes respond sharply to a magnetic field and are very sensitive to a slight leakage flux, which reduces the resolution and the contrast of magnetic indication and deteriorates print quality. Such temperature-dependent problems occur because each magnetic indication sheet has an optimum printing temperature. Thus, the magnetic indication sheet can be used in a narrow working temperature range and, in some cases, the magnetic indication sheet cannot be used at temperatures lower than the optimum working temperature.

SUMMARY OF THE INVENTION

Accordingly, it is an object of the present invention to provide a magnetic indication sheet printing method and a magnetic indication sheet printing apparatus for printing characters and such on a magnetic indication sheet, capable of carrying out an optimum printing process without being affected by the ambient temperature and the temperature of the magnetic indication sheet.

According to a first aspect of the present invention, a magnetic indication sheet printing method for magnetically indicating characters and such on a magnetic indication sheet (2) by means of a magnetic field produced by a print head (52) measures the temperature of the magnetic indication sheet (2) and determines a condition for driving the print head (52) according to the measured temperature of the magnetic indication sheet (2).

According to a second aspect of the present invention, a magnetic indication sheet printing apparatus that magnetically indicates characters and such on a magnetic indication sheet by means of a magnetic field comprises a print head (52) that produces the magnetic field for magnetically indicating characters and such on the magnetic indication sheet (2), a temperature detecting means (temperature sensor) (40) for detecting the temperature of the magnetic indication sheet (2), and a control means (controller) (20) that controls a condition for driving the print head (52) according to the measured temperature of the magnetic indication sheet (2).

When the viscosity of a suspension filling up the microcapsules of a magnetic indication sheet is fixed, the behavior of magnetic microflakes contained in the suspension is proportional to magnetic energy exerted on the magnetic microflakes. However, the viscosity of the suspension is dependent on temperature. The magnetic indication sheet printing method and the magnetic indication sheet printing apparatus of the present invention detect the temperature of a magnetic indication sheet to be printed with characters and such, and determines a condition for driving the print head according to the measured temperature of the magnetic indication sheet. Accordingly, an optimum amount of magnetic energy determined on the basis of the viscosity of the suspension can be exerted on the magnetic indication sheet to achieve high-quality magnetic indication.

According to a third aspect of the present invention, a magnetic indication sheet printing method for magnetically indicating characters and such on a magnetic indication sheet by means of a magnetic field provided by a print head measures the temperature of the magnetic indication sheet (2), heats the magnetic indication sheet (2) when the measured temperature is lower than a predetermined temperature, and determines a condition for driving a print head (52) when the measured temperature is not lower than the predetermined temperature.

According to a fourth aspect of the present invention, a magnetic indication sheet printing apparatus comprises a print head (52) that produces a magnetic field for magnetically indicating characters on the magnetic indication sheet (2), a temperature detecting means (temperature sensor) (40) for detecting the temperature of the magnetic indication sheet (2), a heating means (heat roller) (46) for heating the magnetic indication sheet (2), and a control means (controller) (20) that controls the heating means (46) to heat the magnetic indication sheet when the measured temperature detected by the temperature detecting means (40) is lower than a predetermined reference temperature and controls a condition for driving the print head (52) according to the measured temperature when the measured temperature is not lower than the predetermined reference temperature.

The magnetic indication printing method and the magnetic indication sheet printing apparatus of the present invention raise the temperature of the magnetic indication sheet when the measured temperature of the magnetic indication sheet is lower than the predetermined temperature, and control a condition for driving the print head according to the measured temperature of the magnetic indication sheet when the measured temperature of the magnetic indication sheet is not lower than the predetermined temperature. Accordingly, an optimum amount of magnetic energy can be used for printing according to the viscosity of the suspension, so that characters and such can be magnetically indicated in a high indication quality.

The condition for driving the print head is an energizing time for which a current is supplied to the print head. An optimum amount of magnetic energy can be exerted for printing on the magnetic indication sheet by varying the energizing time according to the measured temperature of the magnetic indication sheet.

The condition for driving the print head is the voltage to be applied to the print head. An optimum amount of magnetic energy can be exerted for printing on the magnetic indication sheet by varying the voltage to be applied to the print head according to the measured temperature of the magnetic indication sheet.

According to a fifth aspect of the present invention, a magnetic indication sheet printing method for magnetically indicating characters and such on a magnetic indication sheet (2) by means of a magnetic field heats the magnetic indication sheet (2) prior to or during printing at an appropriate temperature, and magnetically indicates characters and such on the heated magnetic indication sheet.

According to a sixth aspect of the present invention, a magnetic indication sheet printing apparatus that magnetically indicates characters and such on a magnetic indication sheet (2) by means of a magnetic field comprises a print head (52) for producing the magnetic field for magnetically indicating characters on the magnetic indication sheet (2), and heat roller 46 for heating the magnetic indication sheet (2) at an appropriate temperature.

The magnetic indication sheet printing method and the magnetic indication sheet printing apparatus heat the magnetic indication sheet at an appropriate temperature prior to or during printing, and apply a magnetic field to the magnetic indication sheet heated at the appropriate temperature. Since the suspension has an optimum viscosity when the magnetic indication sheet is heated at the appropriate temperature, characters and such are printed in a high print quality according to the amount of magnetic energy applied to the magnetic indication sheet by the print head.

According to a seventh aspect of the present invention, the magnetic indication sheet further comprises a temperature detecting means (temperature sensors) (40, 48), and a control means (20) that controls the heating means according to the measured temperature detected by the temperature detecting means. In this magnetic indication sheet printing apparatus, the temperature detecting means detects the temperature of the heating means, and the control means controls the heating means according to the measured temperature of the heating means so that the temperature of the heating means is adjusted to an optimum temperature for heating the magnetic indication sheet. Consequently, characters and such can be printed in a high print quality on the magnetic indication sheet.

According to an eighth aspect of the present invention, the magnetic indication sheet printing apparatus further comprises a temperature detecting means for detecting the temperature of the magnetic indication sheet, and a control means that controls the heating means according to the measured temperature of the magnetic indication sheet detected by the temperature detecting means to heat the magnetic indication sheet at an appropriate temperature. In this magnetic indication sheet printing apparatus, the temperature detecting means detects the temperature of the magnetic indication sheet, the heating means is controlled according to the measured temperature of the magnetic indication sheet so that the temperature of the heating means is adjusted to an optimum temperature for heating the magnetic indication sheet. Consequently, characters and such can be printed in a high print quality on the magnetic indication sheet.

DETAILED DESCRIPTION OF THE PREFERRED EMBODIMENTS

First Embodiment

Figure 1:
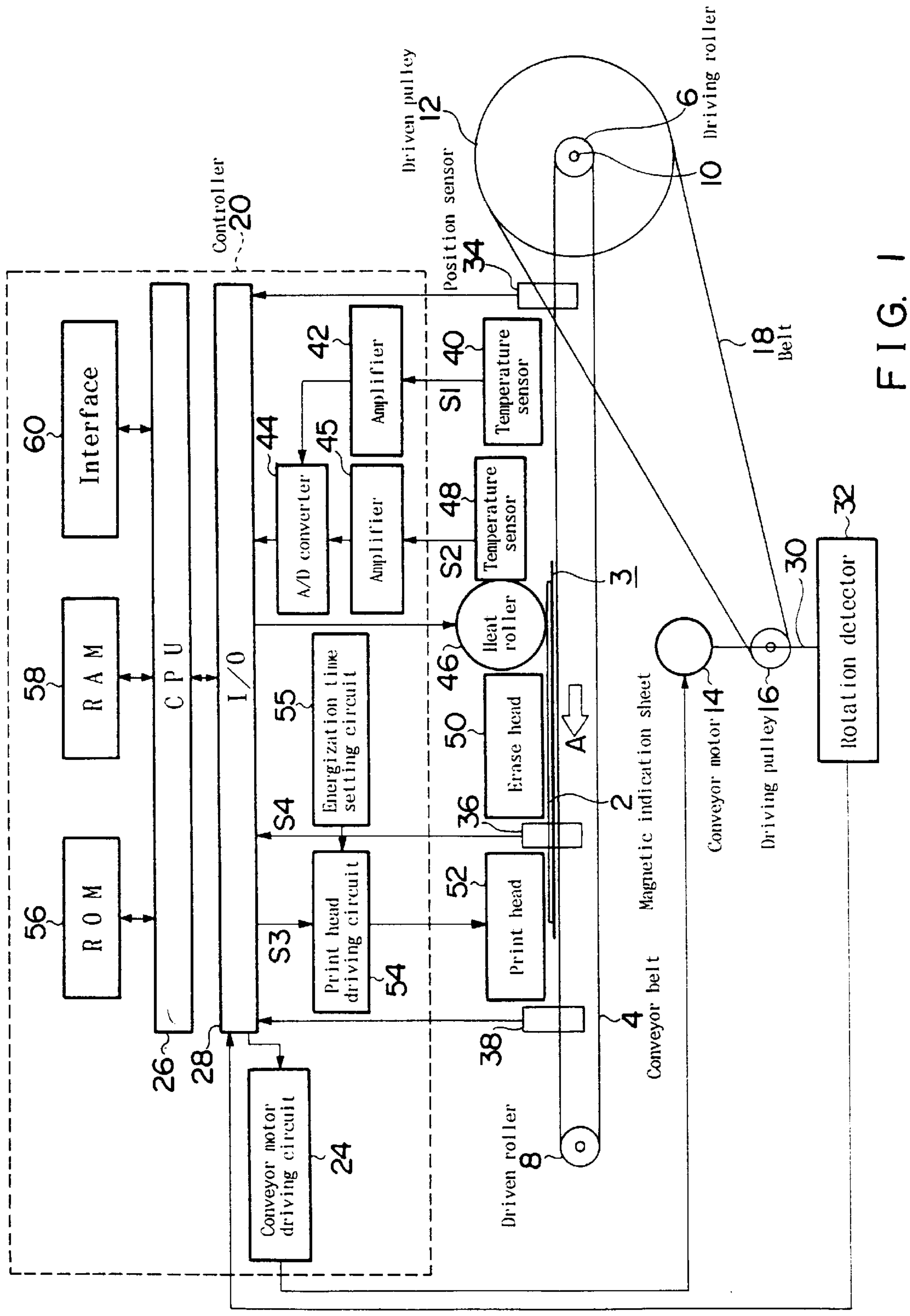
FIG. 1 is a block diagram of a magnetic indication sheet printing apparatus in a first embodiment according to the present invention.

Referring to FIG. 1 showing a magnetic indication sheet printing apparatus in a first embodiment according to the present invention, a magnetic indication sheet 2 to be printed with characters and such is affixed to a card 3, and the card 3 is conveyed by a conveyor belt 4 wound around a driving roller 6 and a driven roller 8. The rotative force of a conveyor motor 14 (driving means) is transmitted to the driving roller 6 through a driving pulley 16 mounted on a rotation shaft 30 of the conveyor motor 14, a belt 18 and a driven pulley 12 mounted on the shaft 10 of the driving roller 6. A conveyor motor driving circuit 24 included in a controller 20 (control means) supplies driving power to the conveyor motor 14. Torque of the conveyor motor 14 is transmitted to the conveyor belt 4 to convey the magnetic indication sheet 2 affixed to the card 3. A central processing unit (CPU) 26 included in the controller 20 gives a control signal through an input/output unit (I/O unit) 28 to the conveyor motor driving circuit 24.

The rotation of the conveyor motor 14 is detected by a rotation detector 32 associated with the rotation shaft 30 of the conveyor motor 14.

The magnetic indication sheet 2 is conveyed in the direction of the arrow A by the conveyor belt 4. A first position sensor 34, a second position sensor 36 and a third position sensor 38 are arranged along the conveyor belt 4, and the output signals of the position sensors 34, 36 and 38 are given to the I/O unit 28.

A first temperature sensor (first temperature detecting means) 40 is disposed behind the first position sensor 34 to detect the temperature of the magnetic indication sheet 2 passed by the first position sensor 34. Upon the detection of the temperature of the magnetic indication sheet 2, the first temperature sensor 40 generates a temperature detection signals S1 corresponding to the temperature of the magnetic indication sheet 2. An amplifier 42 included in the controller 20 amplifies the temperature detection signal S1, an A/D converter 44 converts the amplified temperature detection signal S1 into a corresponding digital signal and gives the digital signal to the I/O unit 28.

A heat roller 46 (heating means) heats the magnetic indication sheet 2 passed by the first temperature sensor 40 on the basis of a predetermined condition. The heat roller 46 comprises a roller body formed of an elastic material, and a heater buried in the roller body to heat the surface of the roller body uniformly. The heat roller 46 rotates synchronously with the rollers 6 and 8 to heat the magnetic indication sheet 2 being conveyed.

A second temperature sensor (second temperature detecting means) 48 is disposed near the heat roller 46 to detect the surface temperature of the heat roller 46, i.e., the temperature of the surface in contact with the magnetic indication sheet 2, and generates a detection signal S2 corresponding to the surface temperature of the heat roller 46. An amplifier 45 included in the controller 20 amplifies the detection signal S2, and then the A/D converter 44 converts the amplified detection signal 82 into a corresponding digital signal and gives the digital signal to the I/O unit 28.

An erase head (erasing means) 50 erases characters and such indicated on the magnetic indication sheet 2. The erasing head 50 comprises a permanent magnet or an electromagnet.

The magnetic indication sheet 2 passed by the erasing head 50 is delivered to a print head 52 disposed in a printing region between the position sensors 36 and 38. The print head 52 executes printing operation while the magnetic indication sheet 2 passes the printing region. A print signal S3 corresponding to print data is given through the I/O unit 28 to a print head driving circuit 54, and the print head driving circuit 54 gives a driving signal to the print head 52 to drive the print head 52 for printing characters and such corresponding to the print data on the magnetic indication sheet 2. Upon the reception of the print signal S3, the print head driving circuit 54 supplies a recording current (magnetizing current), i.e., driving signal, to the print head 52. An energizing time setting circuit 55 for varying the energizing time according to the measured temperature of the magnetic indication sheet 2 is connected to the print head driving circuit 54.

The controller 20 carries out control operations including a control operation for controlling the print head 52 for printing operation and a control operation for controlling the conveyor motor 14. The controller 20 comprises the CPU 26, the I/O unit 28, a ROM 56, a RAM 58, and an interface 60. The ROM 56 stores control programs including those for controlling printing operation and a magnetic indication sheet conveying operation, and driving data for driving the print head 52. The RAM 58 stores measured data including data representing measured temperatures and measured rotation, and develops printing data. A floppy disk may be used as an external storage device. Commands including a print command provided by a host system are received through the interface 60.

Figure 2:
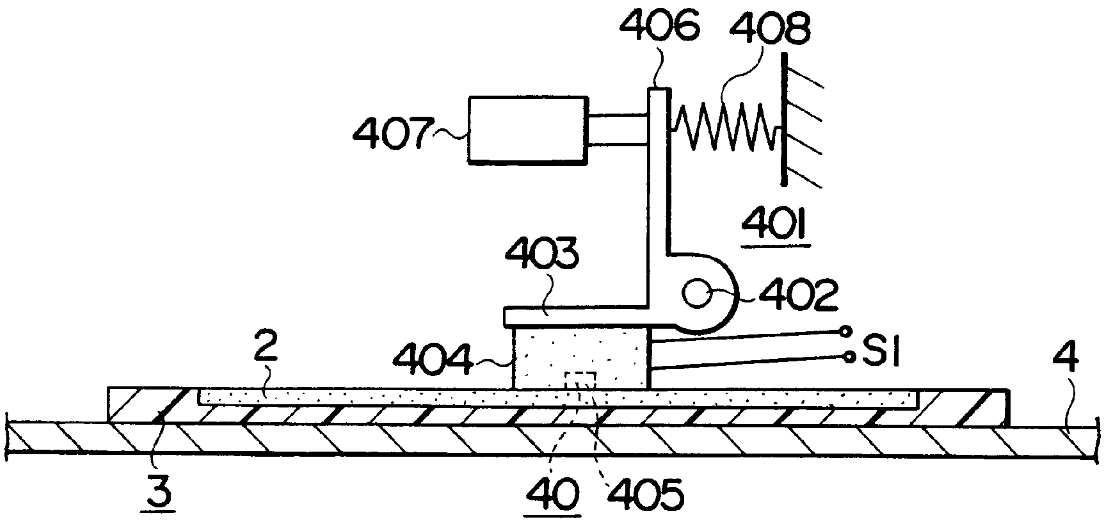
FIG. 2 is a schematic side view of a temperature detecting mechanism including a temperature sensor.

Referring to FIG. 2 showing a temperature detecting mechanism including the first temperature sensor 40, an appropriate elastic force is exerted on the first temperature sensor 40 by an L-shaped lever 401 to press the first temperature sensor 40 against the magnetic indication sheet 2 affixed to the card 3 conveyed by the conveyor belt 4. The lever 401 is rotatably supported around a pin 402, and has a working arm 403 and an actuating arm 406. A thermistor 405 as the temperature sensor 40 is attached to a holding member 404 of silicone sponge or the like attached to the working arm 403 of the lever 401. A solenoid 407 is connected to the actuating arm 406 to turn the lever 401, and a return spring 408 is connected to the actuating arm 406 to return the lever 401 to its standby position so that the thermistor 405 is separated from the magnetic indication sheet 2 when the solenoid 407 is not energized. When measuring the temperature of the magnetic indication sheet 2, the solenoid 407 is energized to bring the thermistor 405 into contact with the magnetic indication sheet 2, and then the detection signal S1 representing the temperature of the magnetic indication sheet 2 appears at the output terminal of the thermistor 405. When the detection of the temperature of the magnetic indication sheet 2 is unnecessary, the solenoid 407 is de-energized, consequently, the lever 401 is turned by the return spring 408 to separate the thermistor 405 from the magnetic indication sheet 2.

Figure 3:
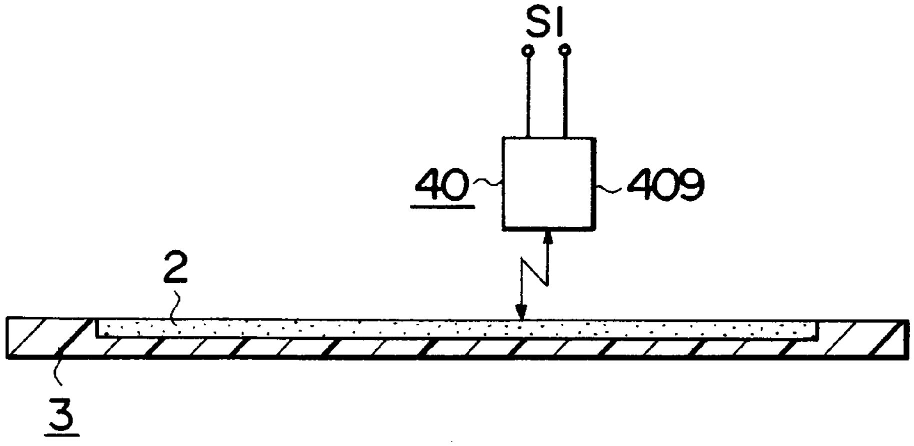
FIG. 3 is a schematic side view of another possible temperature sensor.

As shown in FIG. 3, an infrared temperature sensor 409 capable of detecting the temperature of the magnetic indication sheet 2 without touching the latter may be employed as the temperature sensor 40.

Figure 4:
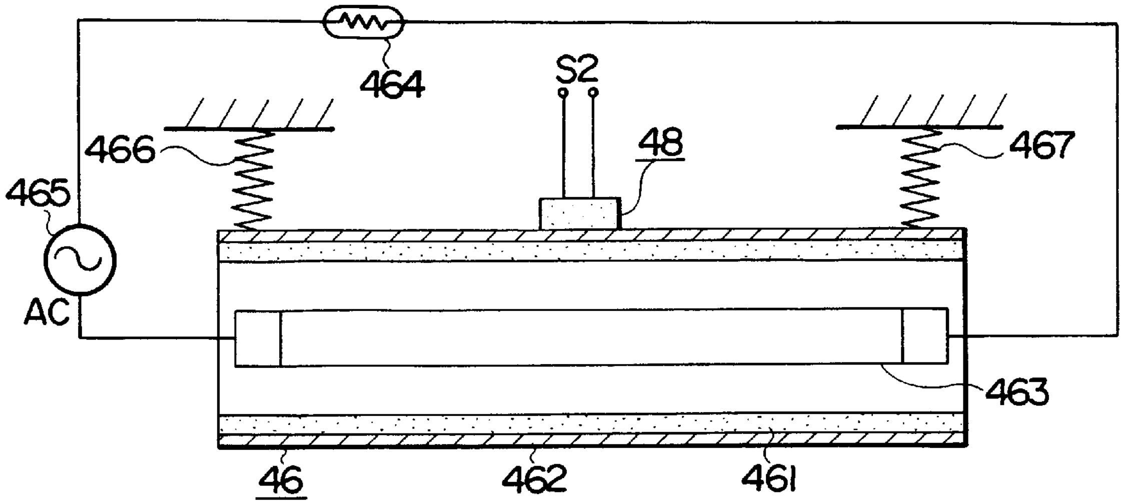
FIG. 4 is a schematic sectional view of a heat roller and a temperature sensor associated with the heat roller.
Figure 5:
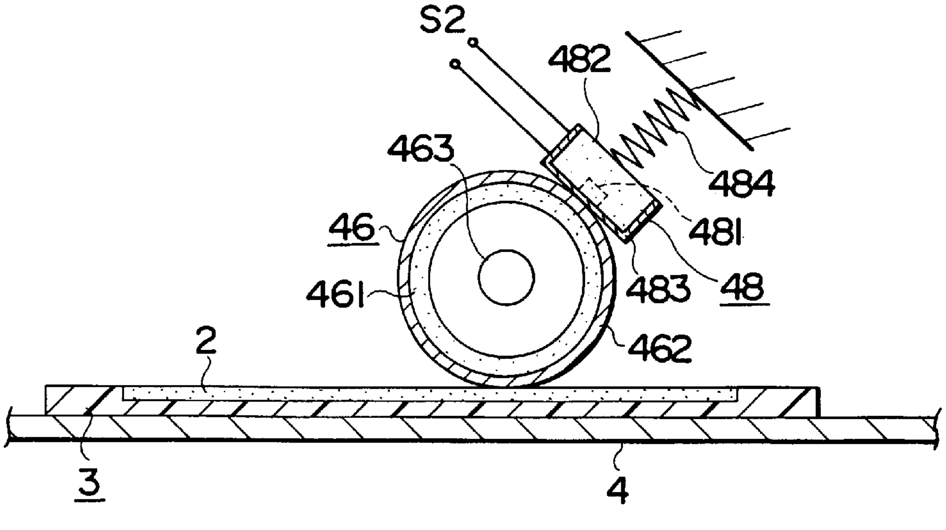
FIG. 5 is a schematic side view of another possible heat roller and a temperature sensor associated with the heat roller.

FIGS. 4 and 5 show concrete examples of the heat roller 46 that heats the magnetic indication sheet 2 being conveyed by the conveyor belt 4, and the second temperature sensor 48 for detecting the surface temperature of the heat roller 46. The heat roller 46 in this example, comprises a hollow roller 461 of a material having a high thermal conductivity, such as aluminum, an elastic layer 462 coated with an elastic material, such as Teflon, provided on the surface of the hollow roller 461, and a halogen heater 463 as a heat source buried in the roller 461. The halogen heater 463 is connected via a thermal fuse 464 to an ac power source 465. The surface of the heat roller 46 is heated uniformly by the heat generated by the halogen heater 463.

The heat roller 46 may be pressed elastically by an appropriate force against the magnetic indication sheet 2.

For example, the heat roller 46 may be pressed against the magnetic indication sheet 2 being conveyed by applying pressure to the heat roller 46 at its opposite ends with compression springs 466 and 467 to heat the magnetic indication sheet 2 uniformly.

The second temperature sensor 48 (second temperature detecting means) detects the surface temperature of the heat roller 46. In this embodiment, a thermistor 481 is employed as the second temperature sensor 48. The thermistor 481 is attached to a holding member 482 of an elastic material, such as silicone sponge, and the temperature detecting surface, i.e., a surface provided with the thermistor 481, and the side surfaces of the holding member 482 are coated with a thin protective film 483, such as a polyimide film. The thin protective film 483 enhances the durability and the heat resistance of the thermistor 481 and the temperature detecting surface. The holding member 482 is pressed at its back surface with a compression spring 484 to bring the temperature detecting surface of the thermistor 481 into elastic contact with the heat roller 46. The detection signal S2 representing the surface temperature of the heat roller 46 appears at the output terminal of the thermistor 481.

Figure 6:
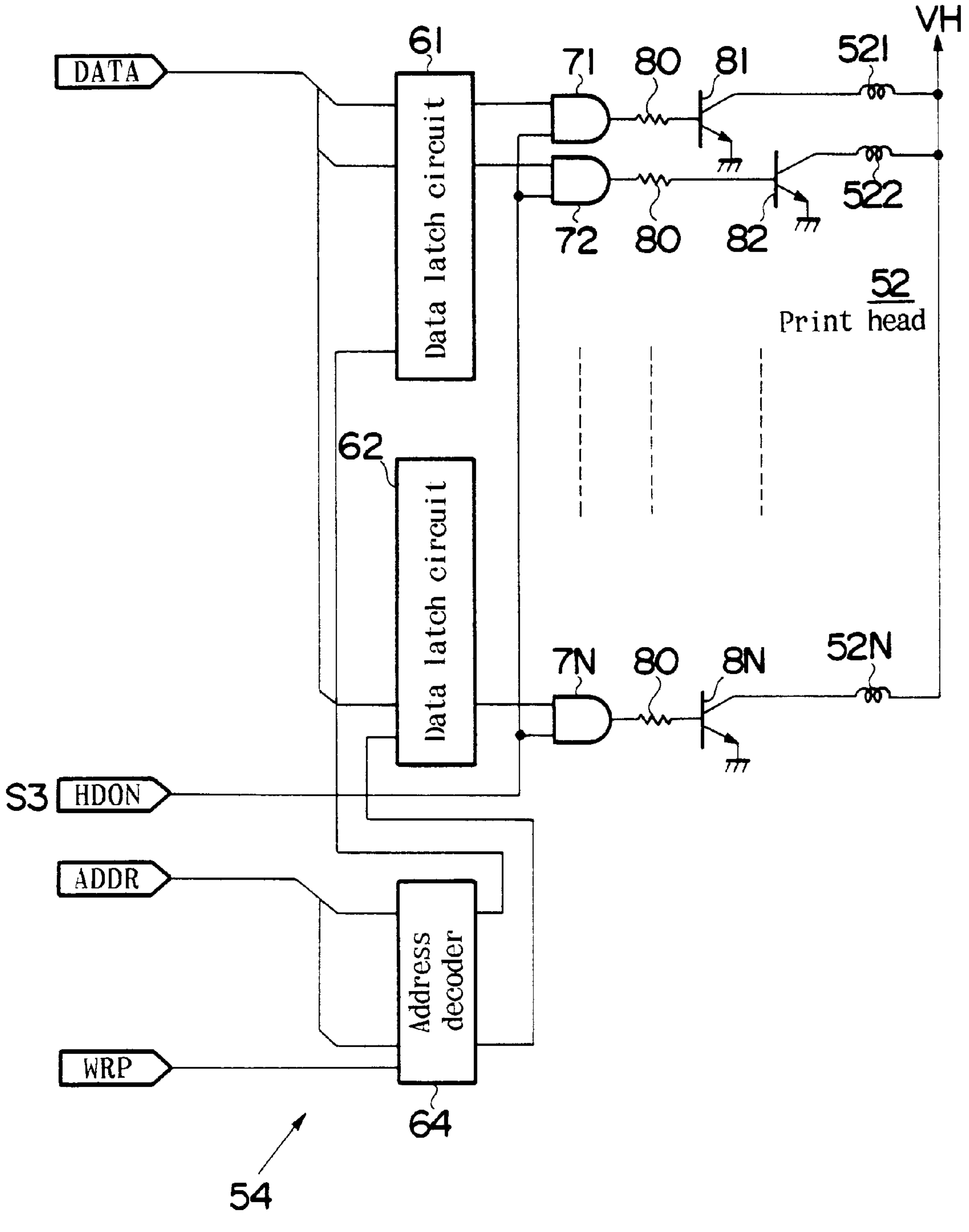
FIG. 6 is a circuit diagram of a print head driving circuit.

Referring to FIG. 6 showing the configuration of the print head driving circuit 54, the print head driving circuit 54 is provided with a plurality of data latch circuits 61 and 62, and an address decoder 64. Print data DATA are applied to the data latch circuits 61 and 62, and an address ADDR and a write pulse signal WRP generated by the CPU 26 are applied to the address decoder 64. The address decoder 64 provides effective decoded result only when the CPU 26 writes print data on the data latch circuits 61 and 62. The output of the address decoder 64 is given to the data latch circuits 61 and 62, and the CPU 26 is able to write print data optionally in the data latch circuits 61 and 62. A plurality of AND circuits 71, 72, . . . and 7N are connected to the output sides of the data latch circuits 61 and 62. The number of the AND circuits 71, 72, . . . and 7N is equal to the number of dots. The AND circuits 71, 72, . . . and 7N carry out a logical AND between the outputs of the data latch circuits 61 and 62, and the print signal S3. While the bits of the print data are HIGH, i.e., when the bits indicate black dots, and the energizing time signal S4 is active, i.e., HIGH, the outputs of the AND circuits 71, 72, . . . and 7N are sent through current limiting resistors 80 to the bases of driving transistors 81, 83, . . . and 8N. The collectors of the driving transistors 81, 82, . . . and 8N are connected to the ends of coils 521, 522, . . . and 52N corresponding to the dots of the print head 52, respectively, and the other ends of the coils 521, 522, . . . and 52N are connected to a printing power source VH. The emitters of the driving transistors 81, 82, . . . and 8N are connected to a ground to maintain the same at a ground potential.

In the print head driving circuit 54 thus constructed, one or more than two of the driving transistors 81, 82, . . . and 8N, corresponding to the print data specifying black dots (HIGH) are turned on selectively for a predetermined time when the print data specifies black dots (HIGH) and the energizing time signal S4 is active, i.e., HIGH, to supply a print current to the selected ones of the coils 521, 522, . . . and 52N of the print head 52 to print characters and such represented by the print data on the magnetic indication sheet 2.

Figure 7:
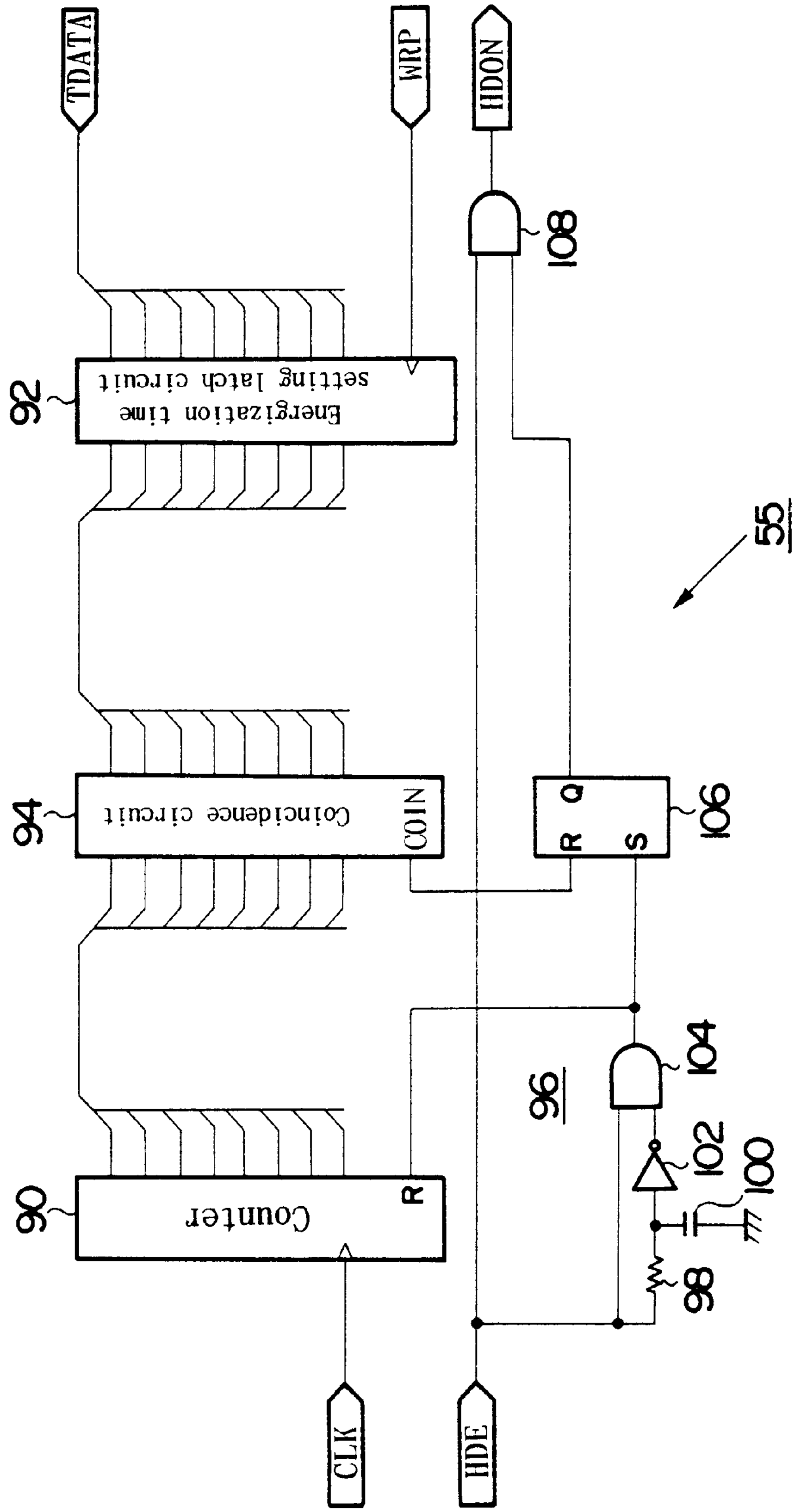
FIG. 7 is a circuit diagram of an energizing time setting circuit.

FIG. 7 shows the concrete configuration of the energizing time setting circuit 55. The energizing time setting circuit 55 comprises a counter 90 capable of counting from 0 to $C_{MAX}$, an energizing time setting latch circuit 92, and a coincidence circuit 94 that detects the coincidence between the number of pulses of a clock signal CLK of a known pulse width (frequency) corresponding to energizing time data provided by the CPU 26, and the data latched by the energizing time setting latch circuit 92. The counter 90 counts the number of pulses of the clock signal CLK of the known pulse width (frequency) given thereto; that is, the counter 90 measures time.

The energizing time setting circuit 55 further comprises an energizing time output unit 96. Upon the reception of an energizing start signal HDE, the energizing time output unit 96 generates an energizing signal HDON. The energizing time output unit 96 has a combination of a resistor 98 and a capacitor 100, serving as an integrator for integrating the energizing start signal HDE. The capacitor 100 has one electrode connected to a NOT circuit 102, and the output of the NOT circuit 102 is connected to an AND circuit 104. The AND circuit 104 carries out logical AND between the output of the NOT circuit 102 and the energizing start signal HDE. The output of the AND circuit 104 is applied to the set input S of an RS flip-flop 106. The coincidence signal COIN provided by the coincidence circuit 94 is applied to the reset input R of the flip-flop 106. An AND circuit 108 carries out logical AND between the output Q of the RS flip-flop 106 and the energizing start signal HDE, and provides an energizing signal HDON. The energizing signal HDON is applied to the AND circuits 71, 72, . . . and 7N of the print head driving circuit 54 to specify energizing sections for the coils 521, 522, . . . and 52N.

Figure 8:
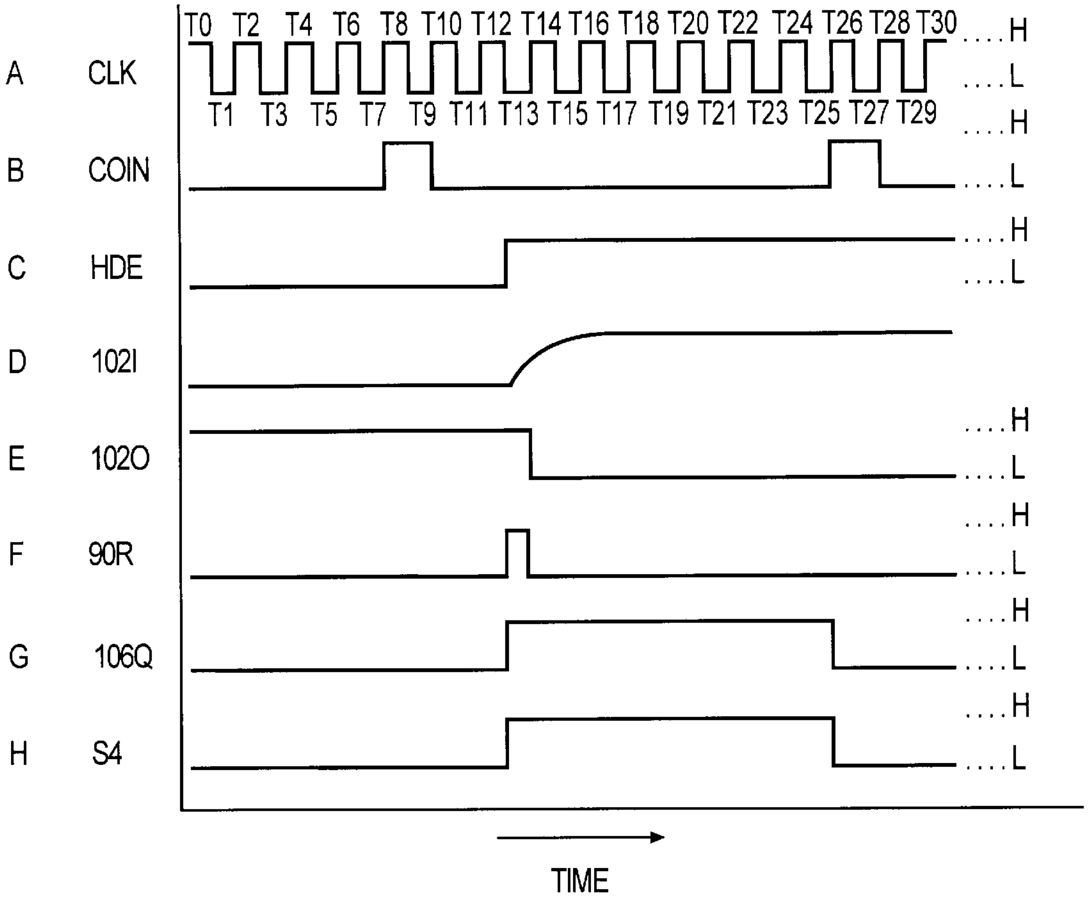
FIG. 8 is a timing diagram for assistance in explaining the operation of an energizing time setting circuit.

The operation of the energizing time setting circuit 55 will be explained below. Energization time data TDATA meeting a condition: $0 < \text{TDATA} \leqq C_{MAX}$ is given beforehand together with the write pulse signal WRP from the CPU 26 to the energizing time setting circuit 55, and the energizing time data TDATA is latched by the energizing time setting latch circuit 92. The initial operation of the CPU 26 sets the energizing start signal HDE to an inactive state (LOW). The clock signal CLK is applied to the counter 90, and the counter 90 counts cyclically from 0 to $C_{MAX}$. Consequently, the coincidence signal COIN goes HIGH as indicated by a rectangular waveform B in FIG. 8 at time corresponding to T8–T9 of the clock signal CLK indicated by a rectangular waveform A in FIG. 8. However, since the energizing start signal HDE is LOW as indicated by a rectangular waveform C in FIG. 8, the energizing time signal S4 remains LOW indicated by a rectangular waveform H in FIG. 8. When the energizing start signal HDE goes HIGH at a time corresponding to a pulse T13, the output of the CR integrator consisting of the resistor 98 and the capacitor 100 and serving as a delay circuit increases gradually and the input 102I of the NOT circuit 102 increases gradually as indicated by a waveform D in FIG. 8. When the input 102I exceeds a threshold determined for the NOT circuit 102, the output 102O is reversed as shown in E. Consequently, the output of the AND circuit 104 remains HIGH in a time interval defined by the CR time constant and the input threshold of the NOT circuit 102. as indicated by a rectangular waveform F in FIG. 8. Thus, the resistor 98, the capacitor 100, the NOT circuit 102 and the AND circuit 104 form a one-shot pulse circuit for detecting the build-up of the energizing start signal HDE. The counter 90 is reset and the count is cleared when a build-up signal 90R is provided. The pulse indicated by a rectangular waveform F in FIG. 8 is applied to the set terminal S of the flip-flop 106 to set the flip-flop 106. Then the output signal 106Q of the flip-flop 106 goes HIGH as indicated by a rectangular waveform G in FIG. 8 and, at the same time, the energizing time signal S4 goes HIGH. When the count reaches the data TDATA at a time corresponding to a pulse T26 when the counter 90 starts counting up from 0, the coincidence signal COIN provided by the coincidence circuit 94 goes HIGH and the flip-flop 106 is reset. Consequently, the output signal 106Q of the flip-flop 106 goes LOW and the energizing time signal S4 goes LOW. The energizing time setting circuit 55 is able to provide the energizing time signal S4 of a pulse width specified by the energizing time data TDATA starting from the build-up of the energizing start signal HDE as indicated by a rectangular waveform H in FIG. 8.

Figure 11:
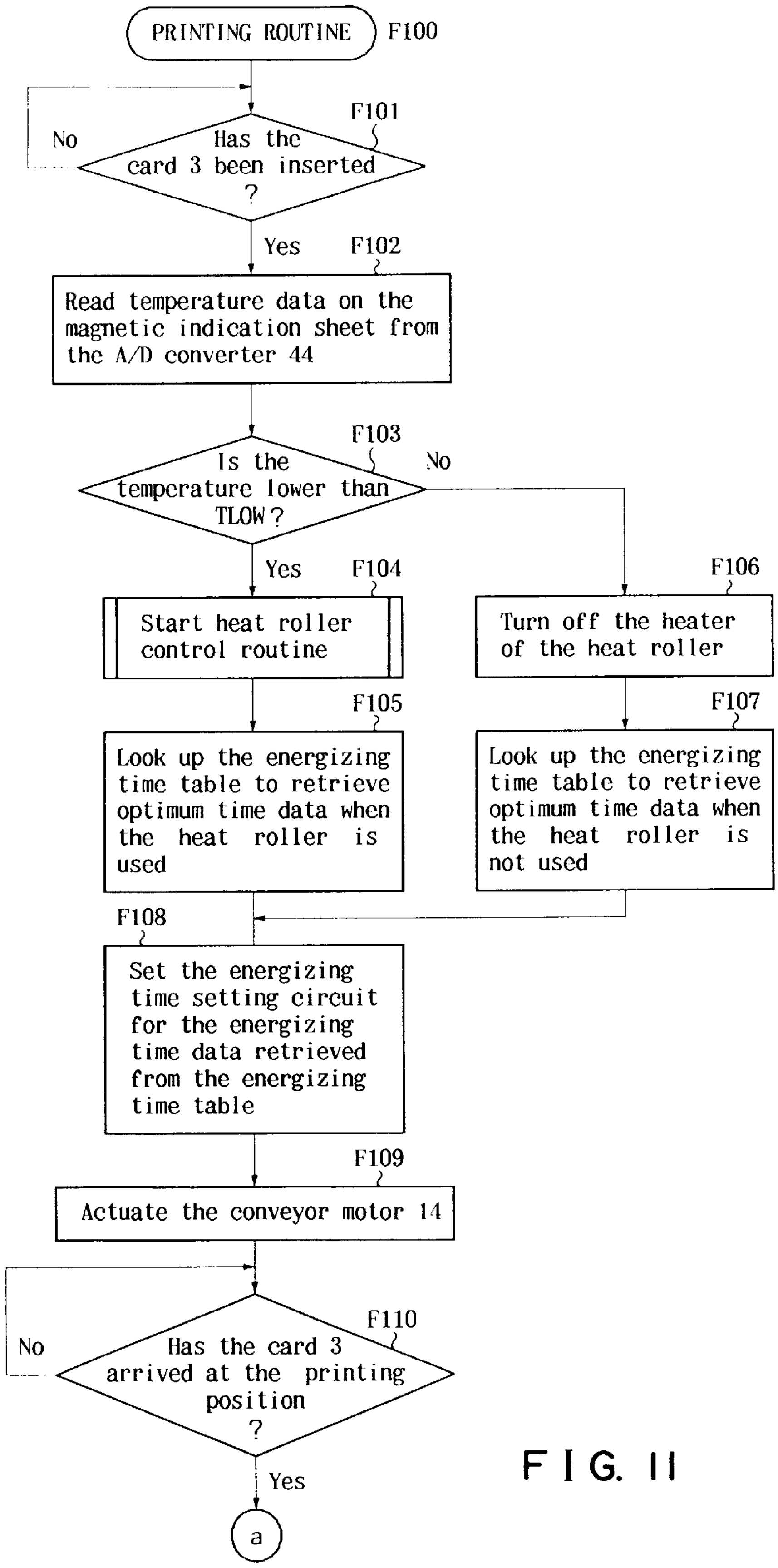
FIG. 11 is a flowchart of a magnetic indication sheet printing method.
Figure 12:
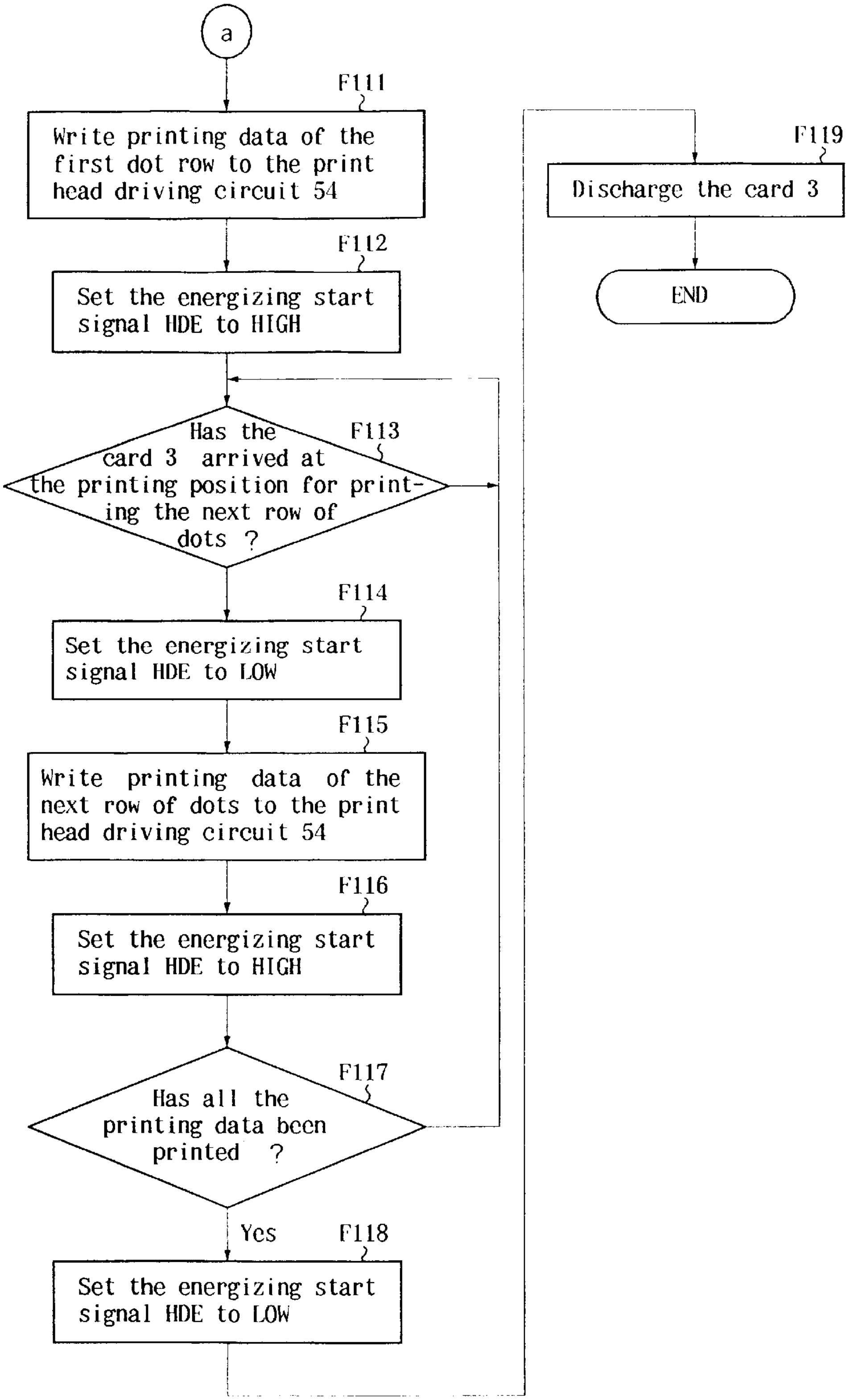
FIG. 12 is a flowchart of a magnetic indication sheet printing method.

A magnetic indication sheet printing method will be described hereinafter with reference to flowcharts shown in FIGS. 9 to 13. In FIGS. 11 and 12, a indicates a connector.

Figure 9:
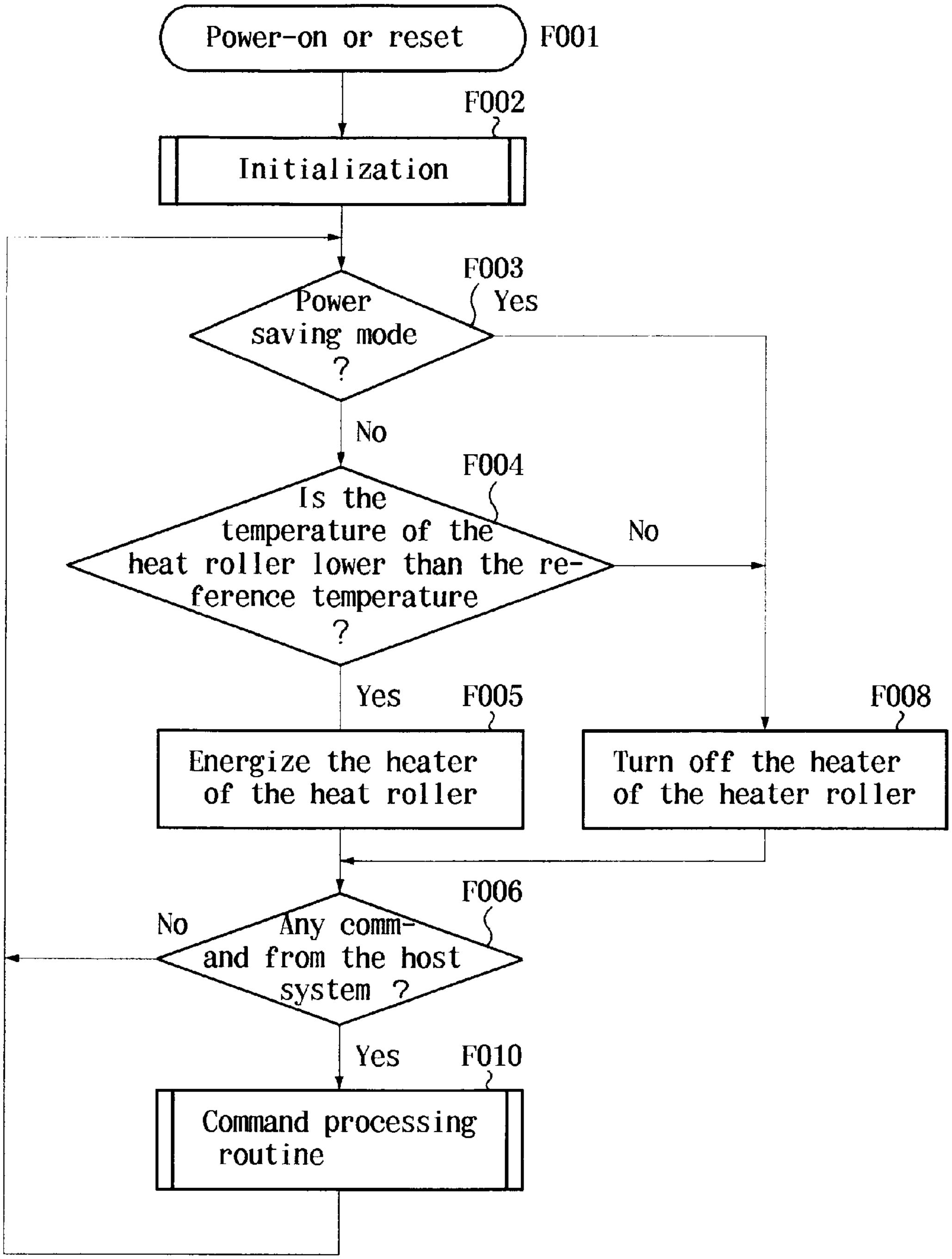
FIG. 9 is a flowchart of a power supply/reset process.

Referring to FIG. 9, upon the connection of the magnetic indication sheet printing apparatus to the power source, the CPU 26 is reset in step F001. A predetermined initialization process is executed in step F002. In step F003 a query is made to see whether or not a power saving mode is selected. Step F008 is executed to turn off the heater regardless of the temperature of the heat roller if the power saving mode is selected or step F004 is executed if the power saving mode is not selected. In step F004, a query is made to see whether or not the temperature of the heat roller is lower than a set temperature. Step F008 is executed to turn off the heater if the temperature of the heat roller is not lower than the set temperature or step F005 is executed to turn on the heater if the temperature of the heat roller is lower than the set temperature. In step F006, a query is made to see whether or not a command is received from the host system connected to the interface 60. The process returns to step F003 and the following steps are repeated if no command is received from the host system or a command processing routine F010 is called if a command is received from the host system.

Figure 10:
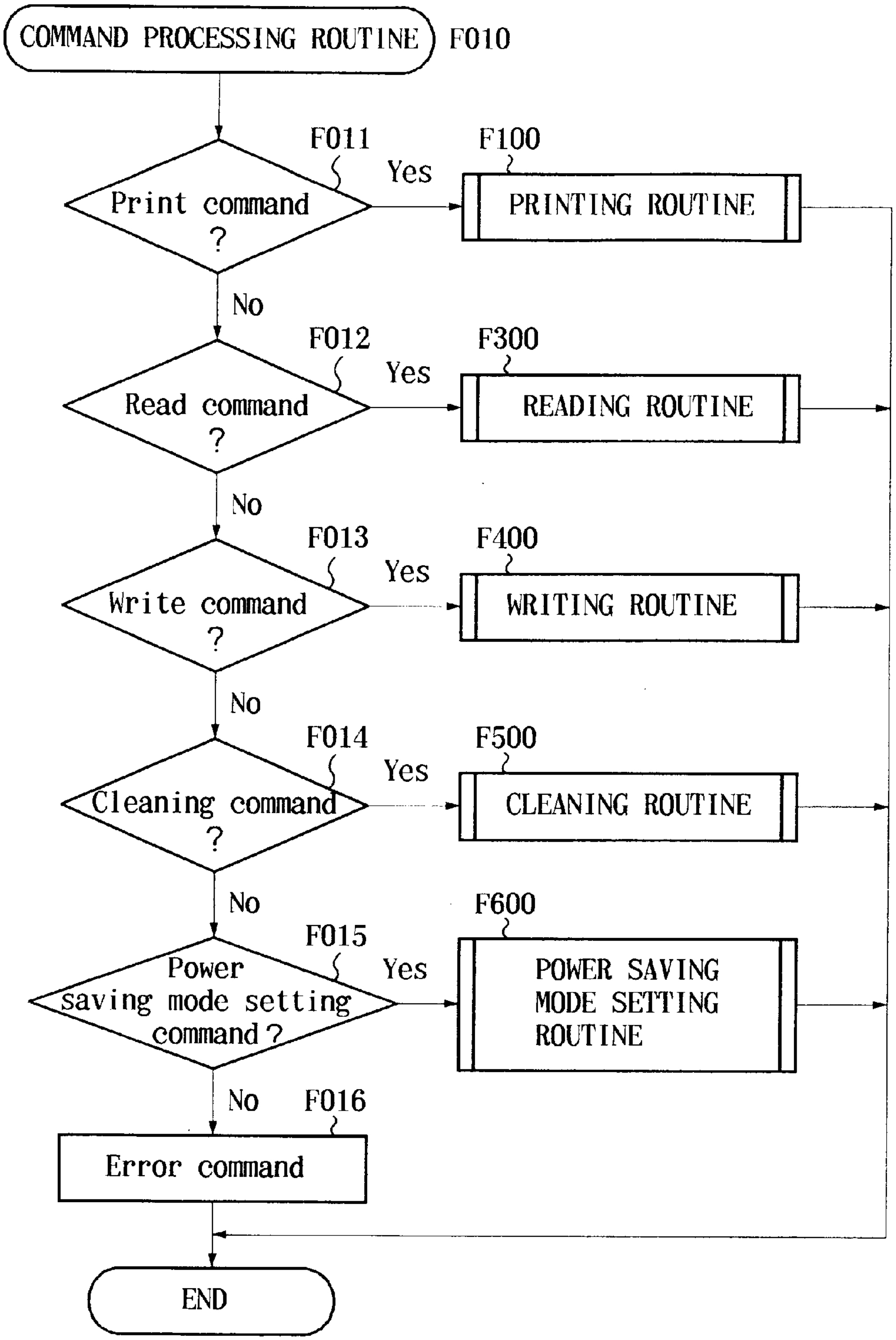
FIG. 10 is a flowchart of a command processing routine.

Referring to FIG. 10 showing the command processing routine F010, the command is analyzed through steps F011, F012, F013, F014 and F015 to call a printing routine F100, a reading routine F300, a writing routine F400, cleaning routine F500 or a power saving mode setting routing F600. If all the responses to queries in steps F011, F012, F013, F014 and F015 are negative, it is decided in step F016 that the command is an error command and the command processing routine is ended.

The operation will be described on an assumption that a print command is given by the host system. When the command is identified as a print command in step F011, the printing routine F100 shown in FIG. 11 is called. In step F101, a query is made to see whether the card 3 is inserted in the magnetic indication sheet printing apparatus. If the response in step F101 is negative, i.e., if the card 3 is not inserted in the magnetic indication sheet printing apparatus, step F101 is repeated until the card 3 is inserted in the magnetic indication sheet printing apparatus. If the response in step F101 is affirmative, temperature data representing the measured temperature of the magnetic indication sheet 2 is read from the A/D converter 44 in step F102, and then the temperature data is compared with a reference temperature TLOW, i.e., a threshold for determining whether the magnetic indication sheet 2 needs heating, in step F103. A heat roller control routine F200 is called in step F104 to heat the heat roller 46 at a set reference temperature TROL if the measured temperature of the magnetic indication sheet 2 is lower than the reference temperature TLOW, and then the routine goes to step F105.

In step F105, an energizing time table is looked up to retrieve an optimum energizing time data when the heat roller 46 is used on the basis of the measured temperature of the magnetic indication sheet 2 detected in step F102, and then step F108 is executed.

When the response in step F103 is negative, the use of the heat roller 46 is interrupted, i.e., the heater of the heat roller 46 is turned off, in step F106, and another energizing time table is looked up to retrieve an optimum energizing time when the heat roller 46 is not used.

In step F108, the energizing time setting circuit 55 is set for the energizing time data retrieved from the energizing time table in step F105 or F107. The conveyor motor 14 is actuated in step F109 to convey the card 3 in the direction of the arrow A shown in FIG. 1. Image data previously recorded on the magnetic indication sheet 3 is erased by the erase head 50 while the card 3 is conveyed through the erase head 50 before the card 3 arrived at the print head 52.

In step F110, a query is made to see whether the card 3 has arrived at the printing position. If the response in step F110 is negative, step F110 is repeated until the card 3 arrives at the printing position. If the response in step F110 is affirmative, i.e., if the card 3 has arrived at the printing position, step F111 (FIG. 12) is executed to write printing data for the first dot row in the print head driving circuit 54, the energizing start signal HDE is set to HIGH in step F112, and then a query is made in step F113 to see whether the card 3 has arrived at a printing position for printing the next dot row. If the response in step F113 is negative, step F113 is repeated until the card arrives at the printing position for printing the next dot row. If the response in step F113 is affirmative, the energizing start signal HDE is set to LOW in step F114 to provide the energizing time signal S4 at the leading edge of the energizing start signal HDE.

Then, printing data for the corresponding row is written in the print head driving circuit 54 in step F115, the energizing start signal HDE is set to HIGH in step F116, and a query is made to see whether all the printing data has been printed in step F117. If the response in step F117 is negative, the routine returns to step F113, and steps 113 to step F117 are repeated. If the response in steps F117 is affirmative, the energizing start signal HDE is set to LOW in step F118, the card 3 is discharged from the magnetic indication sheet printing apparatus in step F119, and then the routine is ended.

Figure 13:
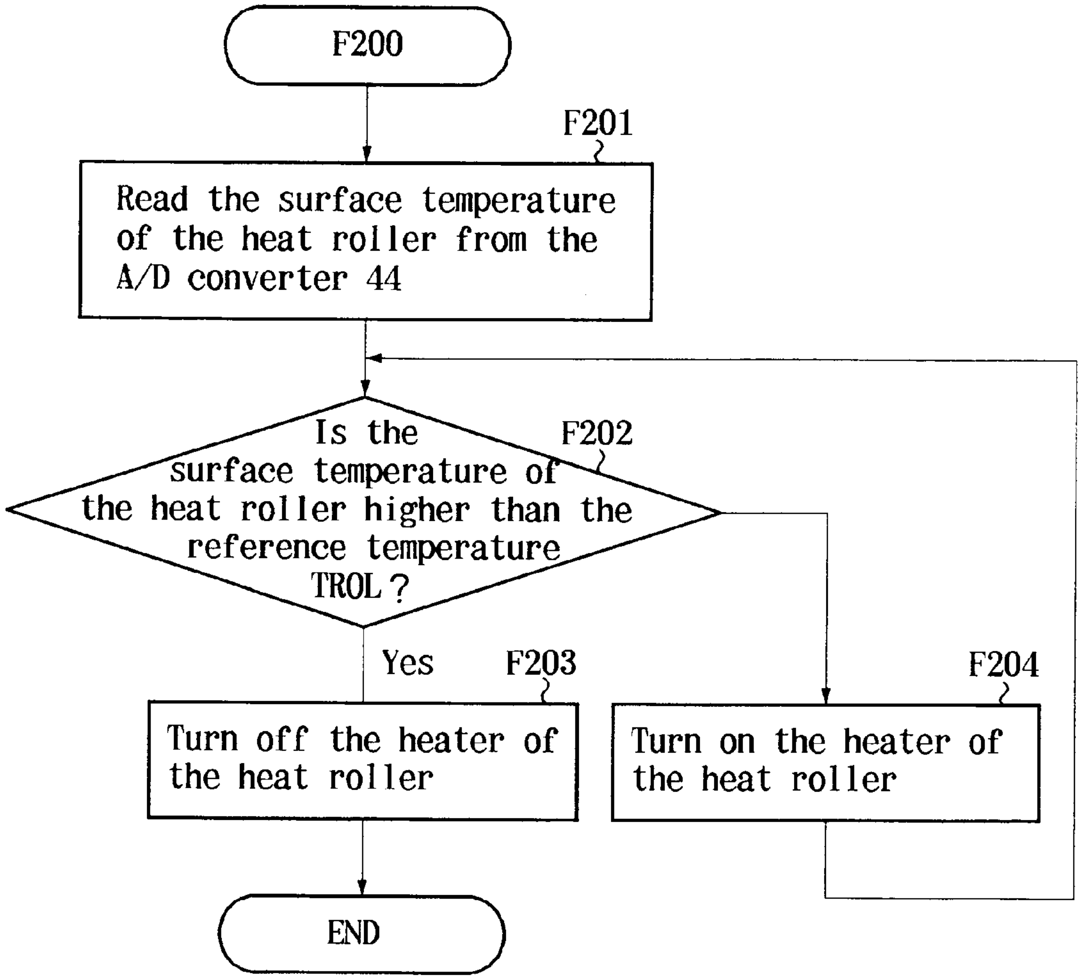
FIG. 13 is a flowchart of a heat roller control routine.

A method of controlling the temperature of the heat roller 46 will be described with reference to FIG. 13. The heat roller control routine F200 for controlling the temperature of the heat roller 46 is called. In step F201, the surface temperature of the heat roller 46 is read from the A/D converter 44, and then the measured surface temperature read in step F201 is compared with the reference temperature TROL in step F202 to see whether the measured surface temperature is higher than the reference temperature TROL. If the response in step F202 is affirmative, power supply to the heater of the heat roller 46 is interrupted in step F203 and the heat roller control routine F200 is ended. If the response in step F202 is negative, i.e., if the surface temperature of the heat roller 46 is not higher than the reference temperature TROL, power is supplied to the heater of the heat roller 46, and steps F202 and F204 are repeated until the surface temperature of the heat roller 46 exceeds the reference temperature TROL to keep the surface of the heat roller 46 at a predetermined temperature.

Figure 14:
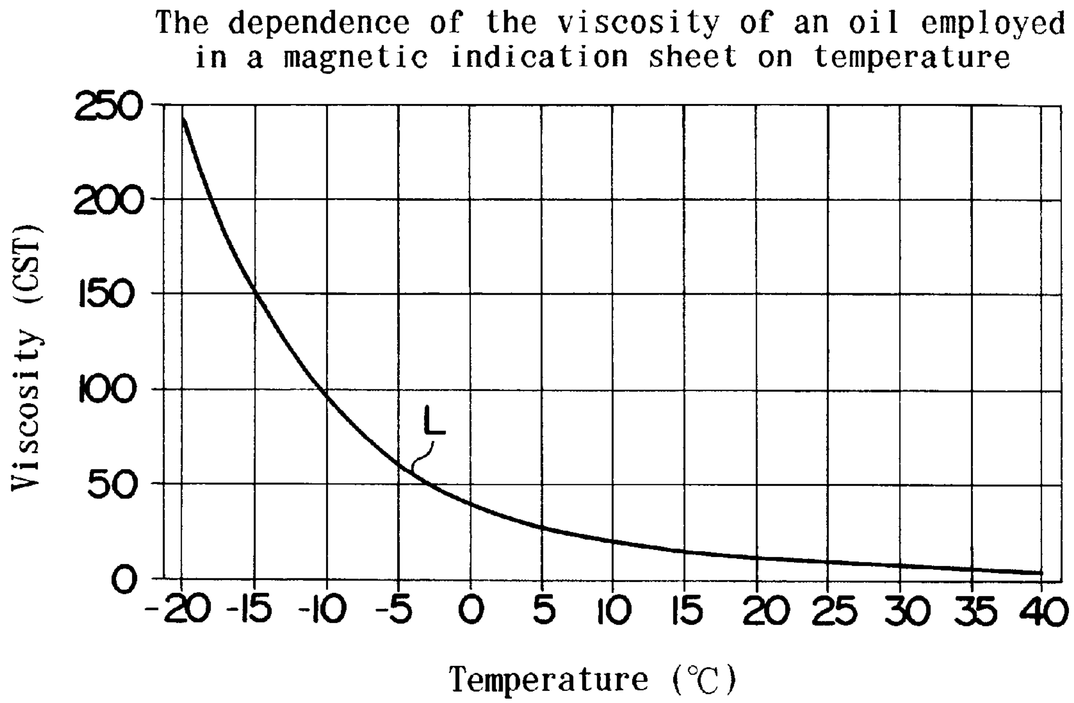
FIG. 14 is a graph showing the dependence of the viscosity of an oil employed in a magnetic indication sheet on temperature.

Operations to achieve optimum printing will be described hereinafter. FIG. 14 is a graph showing the dependence of the viscosity of an ordinary oil as the suspending medium of the suspension contained in the microcapsules of the magnetic indication sheet 2 on temperature. As is obvious from a viscosity curve L shown in FIG. 14, the viscosity changes sharply with temperature in a temperature range of −20° C.

to a room temperature; for example, the viscosity at 15° C. is on the order of ⅕ (one fifth) of the viscosity at −10° C. Thus, the viscosity of the oil is dependent on the ambient temperature and affects the behavior of the magnetic flakes in the suspension.

Figure 15:
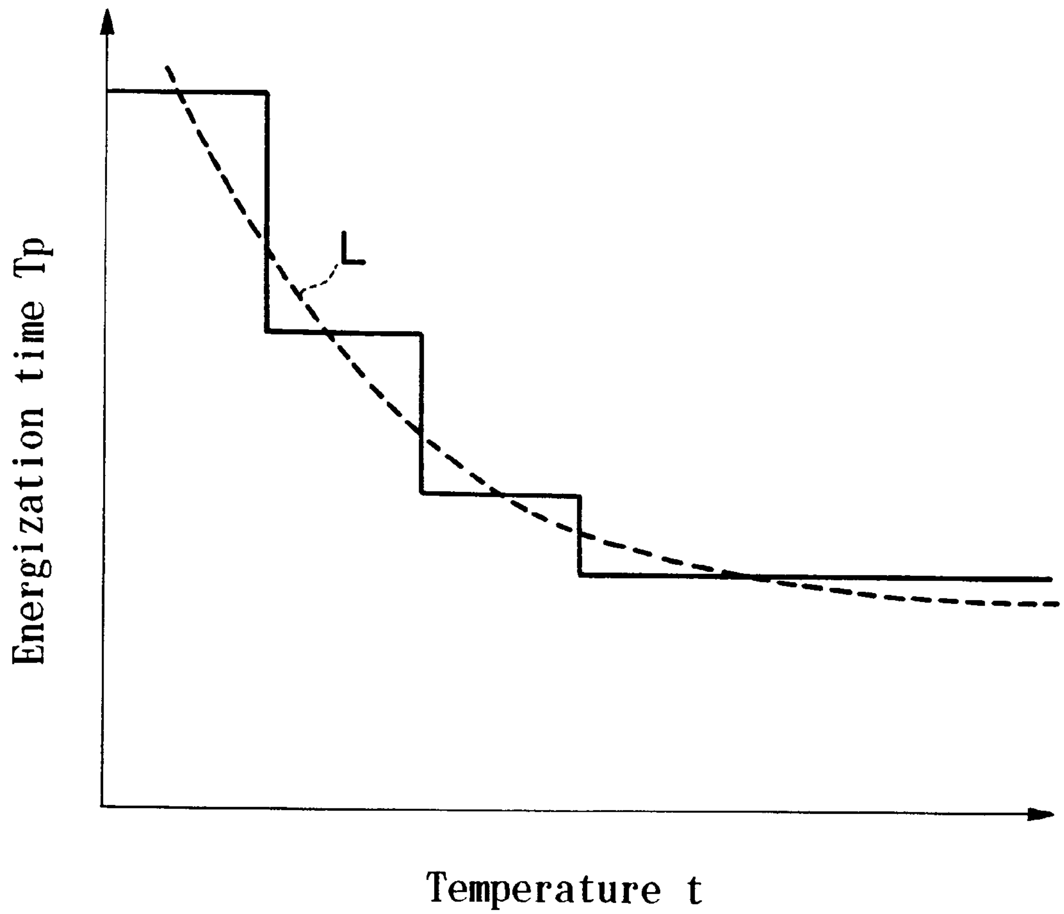
FIG. 15 is a graph showing the relation between energizing time and temperature.

In the first embodiment, the temperature of the magnetic indication sheet 2 is detected and, if the temperature of the magnetic indication sheet 2 is lower than the predetermined temperature of, for example, 20° C., the magnetic indication sheet 2 is heated. If the temperature of the magnetic indication sheet 2 is not lower than the predetermined temperature of, for example, 20° C., the energizing time for which a current is supplied to the print head 52 is changed stepwise to apply an amount of driving energy determined by the temperature of the magnetic indication sheet 2 to the print head 52 so that the print head 52 is driven properly according to the temperature of the magnetic indication sheet 2. A curve L (broken line) shown in FIG. 15 corresponds to the viscosity curve shown in FIG. 14, and energizing time shown in FIG. 15 corresponds to the viscosity of the oil of the suspension.

The energizing time $T_P$ varies stepwise with temperature t, because the measured temperature is converted into a corresponding digital value by the AID converter 44, and energizing time $T_P$ corresponding to the digital value is retrieved from the table stored in the ROM 56. Since the viscosity varies nonlinearly with temperature as shown in FIG. 14, energizing times are assigned to nonlinearly different temperature ranges, respectively.

Figure 16:
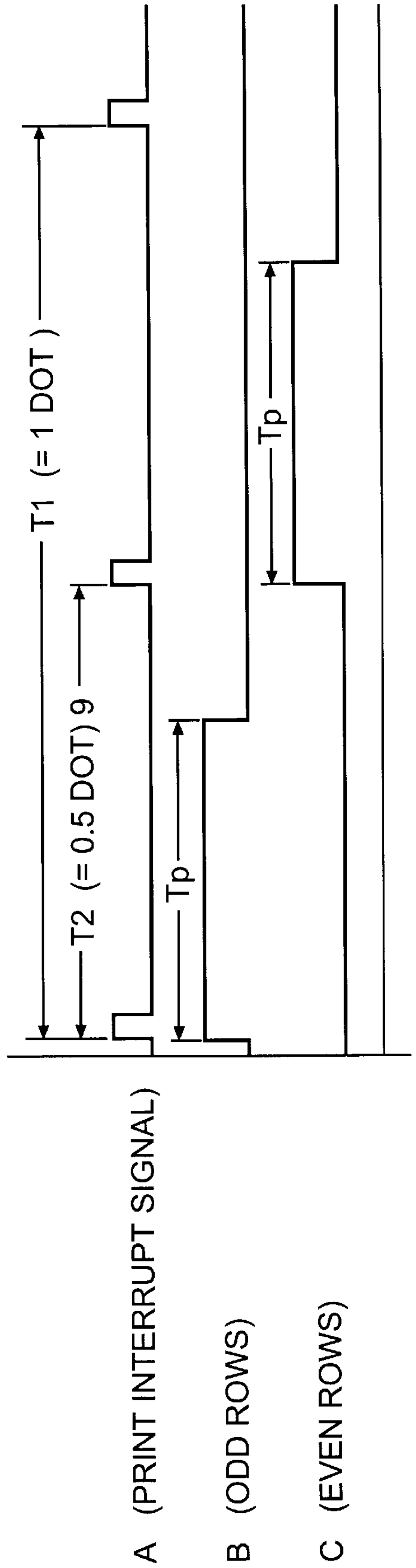
FIG. 16 is a timing diagram for assistance in explaining the timing of operation of a print head in connection with the temperature of a magnetic indication sheet.

FIG. 16 shows the operation of the print head 52 for energizing time $T_P$. The odd dots and the even dots of the print head 52 are energized alternately for every 0.5 dots to use a comparatively low printing current. Pulses generated by the rotation detector 32 associated with the conveyor motor 14 are counted by a counter, and a print interrupt signal as indicated by a rectangular waveform A in FIG. 16 is generated at a fixed interval, for example, every 0.5 dots corresponding to seventeen pulses. T1 is an interval for one dot and T2 is an interval for 0.5 dots. A rectangular waveform B in FIG. 16 indicates the energizing time $T_P$ for the odd dots. The energizing time $T_P$ of the odd dots and the even dots are equal to each other. A rectangular waveform C in FIG. 16 indicates the energizing time $T_P$ for the even dots. The energizing time $T_P$ is determined by a timer according to the measured temperature. The timer counts the clock pulses up to a predetermined value to determine the energizing time $T_P$. Thus, the print head 52 is driven for an optimum printing operation according to the measured temperature, so that the magnetic indication sheet 2 can be printed with characters and such in a high print quality.

The odd dots and the even dots can be alternately actuated by making either the odd dots or the even dots effective by a logical AND operation when transferring print data to the print head 52.

Second Embodiment

Figure 17:
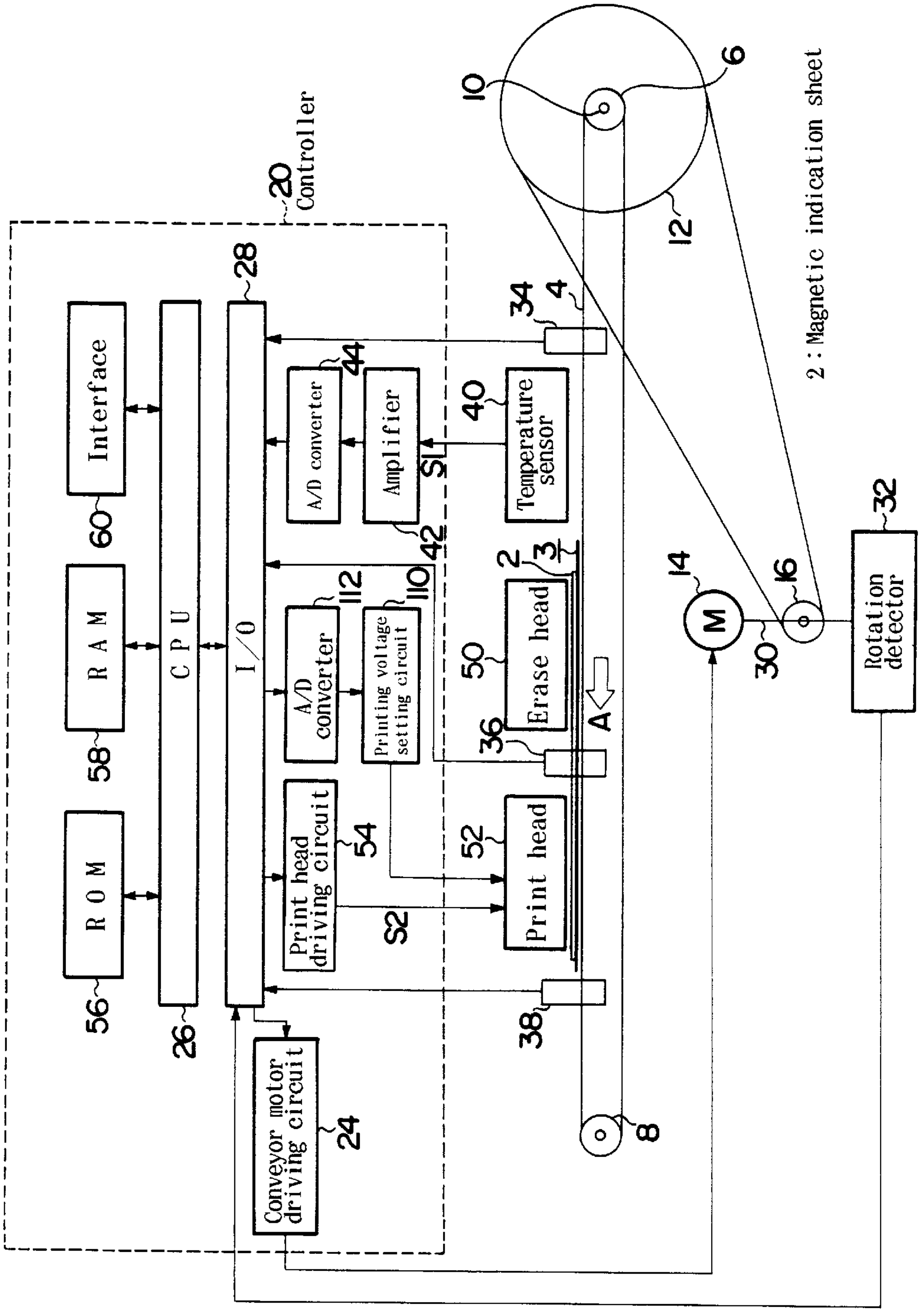
FIG. 17 is a block diagram of a magnetic indication sheet printing apparatus in a second embodiment according to the present invention.

A magnetic indication sheet printing apparatus in a second embodiment according to the present invention is shown in FIG. 17, in which parts like or corresponding to those of the magnetic indication sheet printing apparatus in the first embodiment are designated by the same reference characters. Referring to FIG. 17, a print head 52 is connected to a print head driving circuit 54 and a printing voltage setting circuit 110 for setting a condition for driving the print head 52. A printing voltage data provided by an I/O unit 28 is converted into a corresponding analog set printing voltage VSET by a DIA converter 112, and the analog set printing voltage VSET is given to the printing voltage setting circuit 110.

Figure 18:
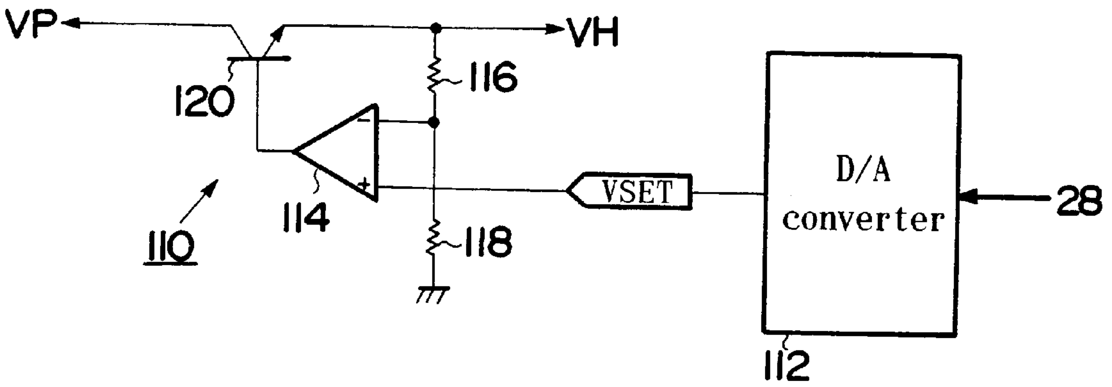
FIG. 18 is a circuit diagram of a printing voltage setting circuit.

Referring to FIG. 18 showing the configuration of the printing voltage setting circuit 110, the printing voltage setting circuit 110 is provided with a voltage comparator 114 comprising an operational amplifier. The set printing voltage VSET provided by the D/A converter 112 is applied to the positive input terminal, and a voltage obtained by dividing a printing voltage VH by a voltage divider consisting of resistors 116 and 118 is applied to the negative input terminal. The output terminal of the voltage comparator 114 is connected to the base of a transistor 120. The printing voltage VH is applied to the emitter of the transistor 120, and a voltage VP is applied to the collector of the transistor 120. Since the output of the voltage comparator 114, i.e., the operational amplifier, is controlled so that the positive and the negative input terminal thereof are equipotential, the relation between the printing voltage VH and the set printing voltage VSET applied to the positive input terminal of the voltage comparator 114 is expressed by:

$$\{R118/(R116+R118)\}VH=VSET \quad (1)$$

and therefore, $$VH=\{(R116+R118)/R118\}VSET \quad (2)$$

where R116 and R118 are the respective resistances of the resistors 116 and 118.

Figure 19:
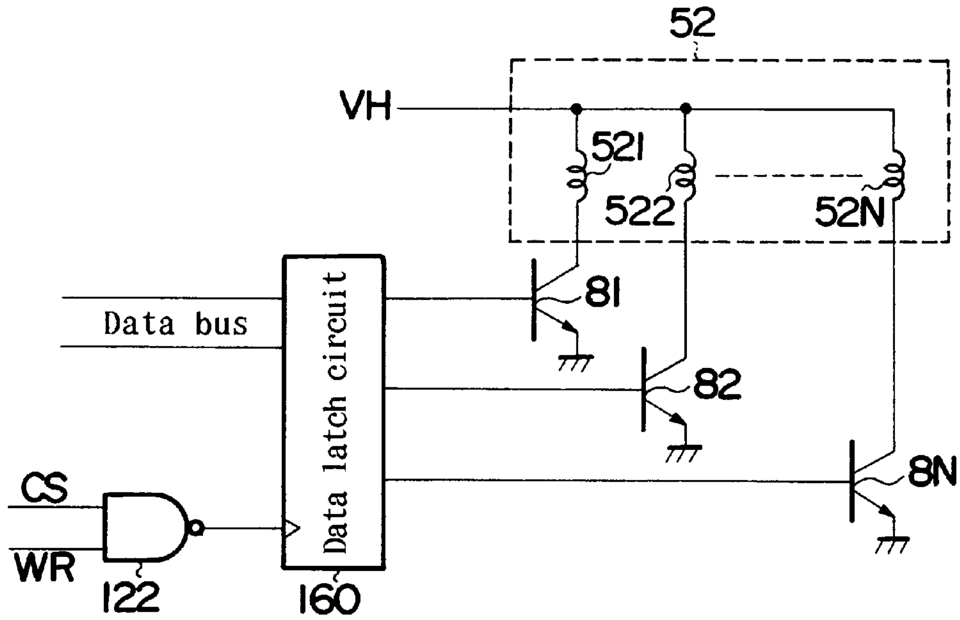
FIG. 19 is a circuit diagram of a print head driving circuit.

The printing voltage VH set by the printing voltage setting circuit 110 is applied to the coils 521, 522, . . . and 52N of the print head 52 shown in FIG. 19. The coils 521, 522, . . . and 52 are connected in series to transistors 81, 82, . . . and 8N, respectively. The output of a data latch circuit 160 is applied to the respective bases of the driving transistors 81, 82, . . . and 8N. Printing data is given through a data bus to the data latch circuit 160, and the output of a NAND circuit 122 is given to the data latch circuit 160. The NAND circuit 122 carries out logical NAND between a chip select signal CS and a write signal WR to select the data latch circuit 160.

Figure 20:
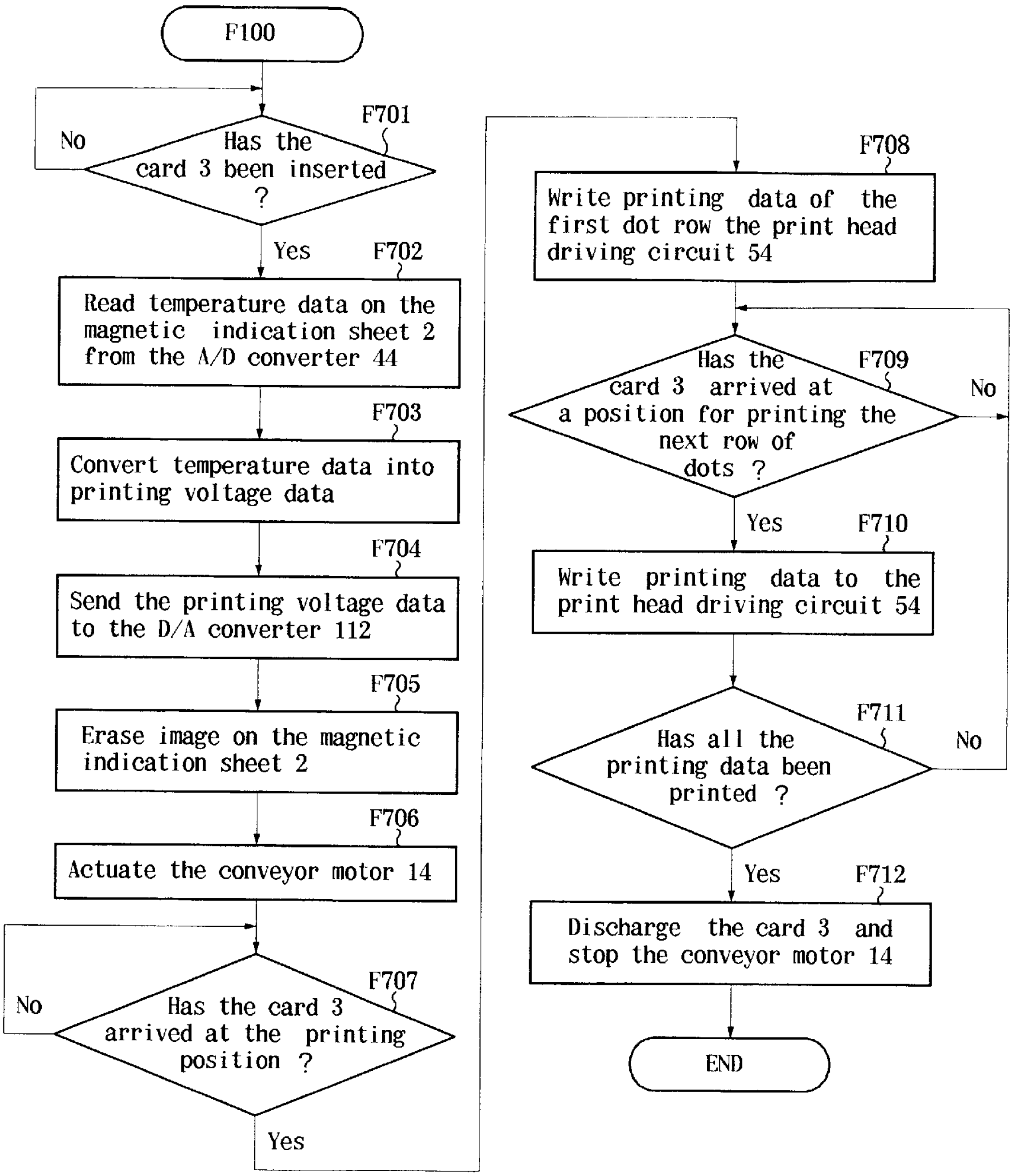
FIG. 20 is a flow chart of a magnetic indication sheet printing method using the magnetic indication sheet printing apparatus of FIG. 17.

A printing process to be executed by the magnetic indication sheet printing apparatus thus constructed will be described with reference to FIG. 20. The card 3 carrying the magnetic indication sheet 2 is put on the conveyor belt 4. A printing routine F100 (PRINT) is called from the ROM 56 in response to a print command given by a host system, such as a host computer, to the magnetic indication sheet printing apparatus. Step F701 is repeated until the card 3 carrying the magnetic indication sheet 2 is detected. Upon the detection of the card 3, temperature data representing the measured temperature of the magnetic indication sheet 2 is read from the A/D converter 44 in step F702, the temperature data is converted into printing voltage data in step F703, and the printing voltage data is given to the D/A converter 112 in step F704.

In step F705, the magnetic indication sheet 2 is delivered to the erase head 50 and image data recorded on the magnetic indication sheet 2 is erased by the erase head 50. In step F706, the conveyor motor 14 is actuated to convey the card 3. In step F707, the detection signal of the position sensor 36 is examined to see whether the card 3 has arrived at the printing position. Printing data for the first dot row among printing data stored in the RAM 58 is read and transferred to the print head driving circuit 54 in step F708 when the response in step F707 is affirmative.

In step F709, a query is made to see whether the card 3 has arrived at a position for printing the next dot row. Printing data for printing the dots currently at the printing position is transferred to the print head driving circuit 54 in step F710 if the response in step F709 is affirmative. In step F711, a query is made to see whether all the printing data, i.e., image data, has been printed. The routine goes to step F712 if the response in step F711 is affirmative or steps F709 to F711 are repeated if the response in step F711 is negative. The card 3 is discharged and the conveyor motor 14 is stopped in step F712, and then the routine is ended.

Thus, the condition for driving the print head 52, i.e., the printing voltage to be applied to the print head 52, is determined according to the temperature data representing the measured temperature of the magnetic indication sheet 2, so that an optimum printing operation can be achieved to print the magnetic indication sheet 2 with characters and such.

Third Embodiment

Figure 21:
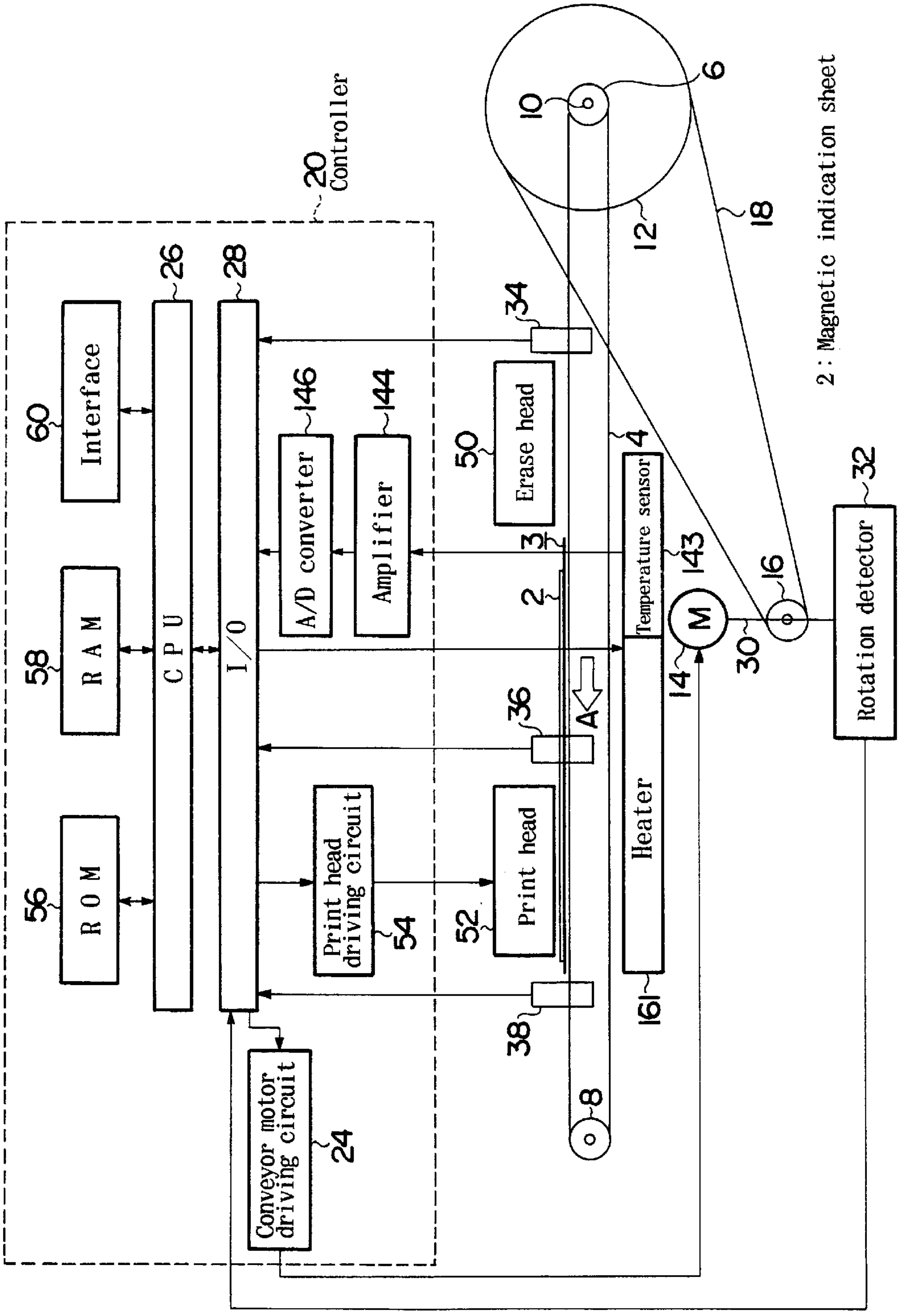
FIG. 21 is a block diagram of a magnetic indication sheet printing apparatus in a third embodiment according to the present invention.

FIG. 21 shows a magnetic indication sheet printing apparatus in a third embodiment according to the present invention. Though the heat roller 46 for heating the magnetic indication sheet 2 heats the magnetic indication sheet 2 before the printing operation in the first embodiment, the heating means is disposed near the print head 52 in the third embodiment. In this embodiment, a heater 161 is disposed on the side of the back surface of the magnetic indication sheet 2, and the heating temperature of the heater 161 is detected by a temperature sensor 143. The temperature of the heater 161 is controlled on the basis of the measured temperature of the heater 161 detected by the temperature sensor 143. Since the heater 161 is disposed on the side of the back surface of the magnetic indication sheet 2, the printing operation can be carried out while the magnetic indication sheet 2 is being heated by the heater 161.

The magnetic indication sheet 2 may be heated by any suitable heating means other than the heat roller 46, such as a sheet heater, a hot-air heater, an infrared lamp or an electromagnetic induction heater.

Although the temperature of the heat roller 46 employed in the foregoing embodiments is controlled by a heating control means comprising, in combination, the temperature sensor 40, the A/D converter 44 and the CPU 26, the heat roller 46 may be controlled by any other suitable heating control means or the magnetic indication sheet printing apparatus of the present invention may employ a heating means having a capability of controlling its own temperature, such as a heater provided with a bimetal switch or a switch employing barium titanate. The use of such a heater is effective in simplifying the configuration of the controller.

Although the foregoing embodiments uses the set reference temperature TROL stored beforehand in the ROM, a temperature specified by operating a switch, a temperature specified by a host system, or a temperature determined taking into consideration the temperature of the magnetic indication sheet, the ambient temperature and the type of the magnetic indication sheet may be used as a reference temperature, which applies also to the reference temperature TLOW for determining whether or not the magnetic indication sheet 2 need heating.

Although the foregoing embodiments heats the entire surface of the magnetic indication sheet uniformly, only necessary portions of the surface of the magnetic indication sheet may be heated according to printing data.

As is apparent from the foregoing description, the present invention has the following effects.

a. Since the temperature of the magnetic indication sheet is measured and the print head is controlled according to the measured temperature of the magnetic indication sheet, an optimum amount of energy for printing can be supplied to the print head and hence characters and such can be stably printed on the magnetic indication sheet in a high print quality without being affected by the temperature of the magnetic indication sheet.

b. Since the magnetic indication sheet is heated when the measured temperature of the magnetic indication sheet is lower than the predetermined temperature, and the print head is controlled according to the measured temperature of the magnetic indication sheet when the measured temperature is not lower than the reference temperature, an optimum amount of energy for printing can be supplied to the print head and hence characters and such can be stably printed on the magnetic indication sheet in a high print quality in a wide temperature range without being affected by the temperature of the magnetic indication sheet.

c. The print quality at low temperatures can be improved only by selectively determining the condition for driving the print head provided that the temperature of the magnetic indication sheet is not lower than the predetermined reference temperature and hence the magnetic indication sheet need not be heated at all times, which reduces power consumption.

d. Since the magnetic indication sheet is heated at an optimum temperature prior to printing or during printing, the suspension contained in the microcapsules of the magnetic indication sheet has a satisfactory fluidity, so that characters and such can be printed in a high print quality.

e. Since the magnetic indication sheet is heated to reduce the viscosity of suspension and to improve the fluidity of the suspension, characters and such can be printed on the magnetic indication sheet by imparting a comparatively small amount of magnetic energy to the magnetic indication sheet by the print head, the print head needs to be energized for a comparatively short energizing time and hence the printing operation can be accomplished in a comparatively short time.

Although the invention has been described in its preferred form with a certain degree of particularity, obviously many changes and modifications are possible therein. It is therefore to be understood that the present invention may be practiced otherwise than as specifically described herein without departing from the scope and spirit thereof.

What is claimed is:

1. A method for magnetically printing a magnetic image on a magnetic indication sheet containing microcapsules of suspended magnetic material, the method comprising the steps:

measuring the temperature of the magnetic indication sheet;

subjecting a printing head to driving conditions dependent on the temperature of the magnetic indication sheet;

energizing the printing head in accordance with the temperature related driving conditions;

generating an electromagnetic field by the printing head that aligns suspended magnetic material in a magnetic indication sheet to form a magnetic image.

2. The method set forth in claim 1 wherein the driving conditions correspond to a period of printing head energization.

3. The method set forth in claim 1 wherein the driving conditions correspond to a voltage applied to the printing head during energization thereof.

4. An apparatus for magnetically printing a magnetic image on a magnetic indication sheet containing microcapsules of suspended magnetic material and comprising:

means for measuring temperature of the magnetic indication sheet;

control means for setting drive conditions in response to the temperature measured by the temperature measuring means;

printing head means for generating an electromagnetic field in accordance with the driving conditions set by the control means;

means for relatively changing a positional relationship between the magnetic indication sheet and the printing head means, to align the suspended magnetic material in the magnetic indication sheet to form the magnetic image.

5. The apparatus set forth in claim 4 wherein the control means develops driving conditions corresponding to a period of printing head energization.

6. The apparatus set forth in claim 4 wherein the control means develops driving conditions corresponding to energizing voltage applied to the printing head.

7. A method for magnetically printing a magnetic image on a magnetic indication sheet containing microcapsules of suspended magnetic material, the method comprising the steps:

measuring the temperature of the magnetic indication sheet;

heating the magnetic indication sheet when the measured temperature is below a predetermined threshold value;

subjecting a printing head to driving conditions when the measured temperature is not below the predetermined threshold value;

energizing the printing head in accordance with the driving conditions; and generating an electromagnetic field by the printing head that aligns the suspended magnetic material in the magnetic indication sheet to form the magnetic image.

8. The method set forth in claim 7 wherein the driving conditions correspond to a period of printing head energization.

9. The method set forth in claim 7 wherein the driving conditions correspond to a voltage applied to the printing head during energization thereof.

10. An apparatus for magnetically printing a magnetic image on a magnetic indication sheet containing microcapsules of suspended magnetic material and comprising:

means for measuring temperature of the magnetic indication sheet;

heating means for selectively heating the magnetic indication sheet;

printing head means for generating an electromagnetic field;

control means for setting driving conditions in response to the temperature measured by the temperature measuring means;

the control means a) energizing the heating means in the event the measured temperature is below a threshold value thereby heating the magnetic indication sheet; and b) actuating the printing head means in accordance with the driving conditions, without energizing the heating means, in the event the measured temperature is above the threshold value; and means for relatively changing a positional relationship between the magnetic indication sheet and the printing head means, to align the suspended magnetic material in the magnetic indication sheet to form the magnetic image.

11. The apparatus set forth in claim 10 wherein the control means develops driving conditions corresponding to a period of printing head energization.

12. The apparatus set forth in claim 10 wherein the control means develops driving conditions corresponding to a voltage applied to the printing head during energization thereof.

13. A method for magnetically printing a magnetic image on a magnetic indication sheet containing microcapsules of suspended magnetic material, the method comprising the steps:

heating the magnetic indication sheet; and energizing the printing head to generate an electromagnetic field by the printing head that aligns suspended magnetic material in a magnetic indication sheet to form a magnetic image.

14. An apparatus for magnetically printing a magnetic image on a magnetic indication sheet containing microcapsules of suspended magnetic material and comprising:

heating means for heating the magnetic indication sheet;

printing head means for applying an electromagnetic field corresponding to the magnetic image to be printed to the magnetic indication sheet heated by the heating means; and means for relatively changing a positional relationship between the magnetic indication sheet and the printing head means, to align the suspended magnetic material in the magnetic indication sheet to form the magnetic image.

15. The apparatus set forth in claim 14 further comprising:

means for measuring temperature of the heating means; and means for controlling the temperature of the heating means on the basis of the measured temperature.

16. The apparatus set forth in claim 14 further comprising:

means for measuring temperature of the magnetic indication sheet; and means for controlling the temperature of the heating means on the basis of the measured temperature.

* * * * *